Nov. 22, 1932.　　　A. KOSIAN　　　1,888,273
UNIVERSALLY MOUNTED SPOTLIGHT
Filed July 17, 1931　　2 Sheets-Sheet 1
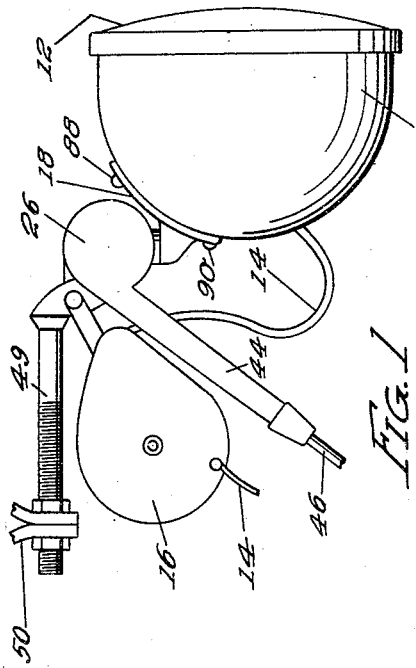
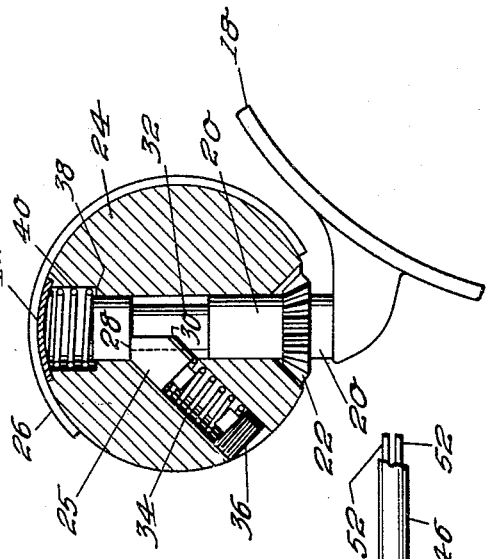
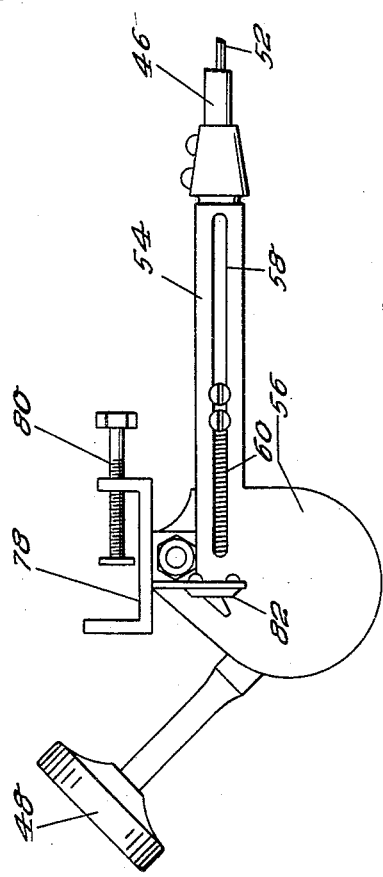
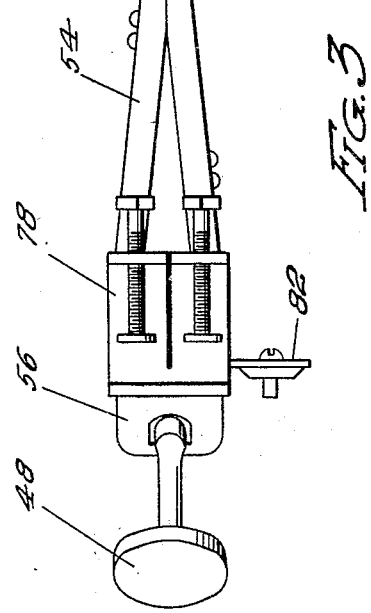
ARTHUR KOSIAN
INVENTOR
PER
ATTORNEY

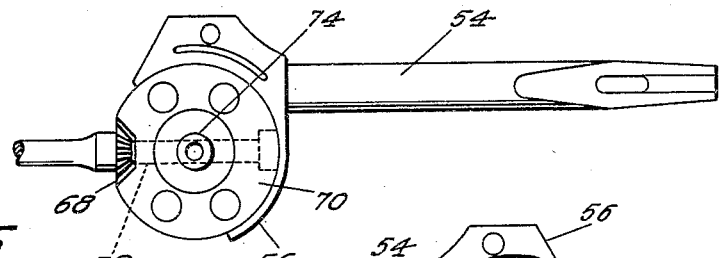
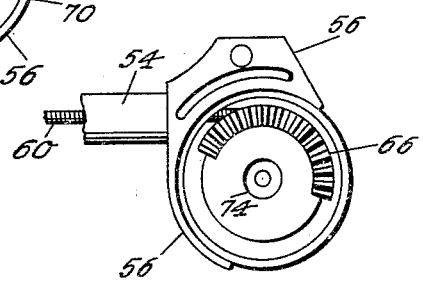
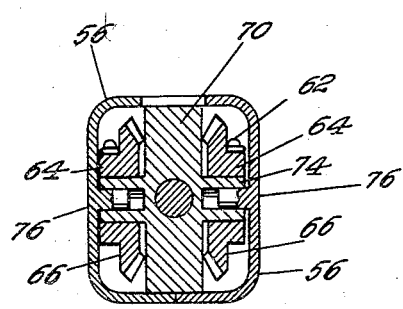
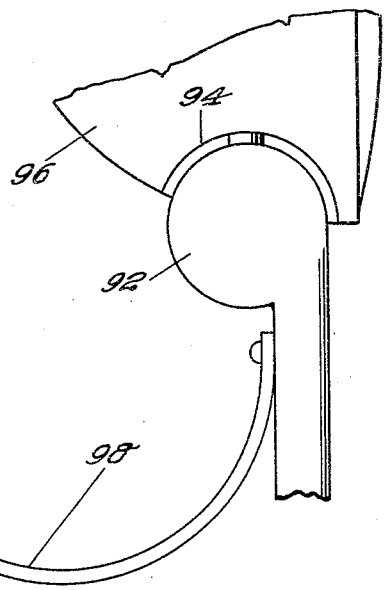
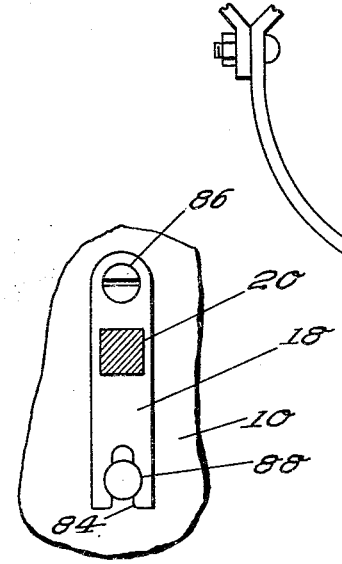

Patented Nov. 22, 1932

1,888,273

UNITED STATES PATENT OFFICE

ARTHUR KOSIAN, OF CHICAGO, ILLINOIS

UNIVERSALLY MOUNTED SPOTLIGHT

Application filed July 17, 1931. Serial No. 551,462.

This invention relates to an improved universally mounted spotlight, and has for one of its principal objects the provision of a spotlight for automobiles or the like, which can be mounted at the front of the car, preferably in a fairly low position, and which at the same time can be conveniently controlled from the dash or the operator's seat.

One of the important objects of this invention resides in the provision of a universally mounted spotlight for automobiles or the like which by the operation of a single handle remote from the light itself can be be shifted through wide angles, both vertically and horizontally, and also through any intermediate positions.

The present application contemplates an improvement over this same applicant's prior Patent No. 1,768,613, dated July 1, 1930, and a pending application for patent also on a similar device, Serial No. 425,406, filed February 3, 1930.

The essential improvements embodied in the present structure comprises a more positive control with no lost motion, a better and more reliable mounting of the lamp itself, so that it will not become dislodged under vibration, and an improved means of quickly dismounting the lamp from its fixture, so that the same can be readily shifted to the rear or sides of the car for use as a trouble lamp.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved universally mounted spotlight of this invention, showing the means for fixing the same in position on the front of a car, and also showing the reel in which is mounted the length of wire leading to the light.

Figure 2 is a side elevation of the improved control handle for the lamp, this being remote therefrom, and preferably mounted on the dashboard or steering wheel of the automobile.

Figure 3 is a top plan view of the control handle.

Figure 4 is a detail sectional view, illustrating the improved universal mounting for the lamp housing with the lamp removed.

Figure 5 is a detail view showing a part of the interior construction of the universal handle control.

Figure 6 is a similar view, illustrating that part of the handle control associated with the elements shown in Figure 5, and it might be mentioned that a very similar construction is employed for the lamp mounting.

Figure 7 is a detailed sectional view illustrating the system of universal or differential gears used in the control, and corresponding to the side elevations of Figures 5 and 6.

Figure 8 is a side elevation, parts being broken away, showing a modified form of mounting for the lamp housing.

Figure 9 is a detail view, illustrating essentially the quickly removable support for the lamp housing, a side view of which is found in Figure 1.

As shown in the drawings:

The reference numeral 10 indicates generally the housing for a spotlight or the like, having the usual source of light therein and protecting lens 12 together with a wire 14 for supplying the current thereto.

The wire is wound on a reel in a housing 16 from whence it can be withdrawn against the tension of a spring in the reel whenever the lamp is desired to be positioned at a remote portion of the automobile for use in making tire repairs or the like.

The lamp housing is removably mounted on a bracket 18, the bracket forming part of a spindle 20 upon the lower end of which is fixed a bevel-gear 22. The spindle with the gear is rotatably mounted in a cylindrical opening in a disk-like element 24, this disk-like element being rotatably mounted in a housing 26, the axis of rotation of the spindle 20 being at right angles to the axis of rotation of the disk-like element 24.

The spindle 20 does not extend completely through the opening in the disk-like element 24, but is supported therein as best shown in Figure 4 by a spring-impelled plug 25 which plug acts at an angle of approximately 45° to the spindle 20, having two bearing surfaces thereagainst, one at 28 against a corresponding shoulder formed in the plug and one at 30 against a portion of the plug 32 which is of a reduced diameter. A helical spring 34 is mounted in the recess in which the plug 26 is fitted, and normally impels the plug into close contact with the shouldered portion of the spindle 20, the tension of the spring being adjustable by means of a set-screw or the like 36, which is likewise mounted in a correspondingly screw-threaded portion of the opening for the plug and spring.

The cylindrical opening in which the spindle 20 is mounted is of a larger diameter at its upper end, and upon the shoulder 38 formed at this larger diameter is mounted a helical spring 40 which acts against a movable plate 42, which, in turn, has a frictional contact with the inner face of the adjacent side edges of the housing 26. In this way, a sliding frictional contact of the disk-like element 24 in the housing 26 will be assured, and undesirable rotation of the parts with respect to each other is prevented.

The housing 26 is in two portions fitted together, and each portion has a sleeve 44 integral therewith or attached thereto, and in each of these sleeves is slidably mounted an operating wire or flexible rod, both of which thence pass into a flexible conduit 46 which leads back to the manipulating handle 48 and its associated parts.

The housing 26 with the light 10 and the reel 16 and associated elements affixed thereto are all mounted on a bracket, rod or the like 19 which has clamp elements 50 attached to its rear end for convenient mounting on the forward portion of an automobile or any other device upon which the lamp is desired to be used.

The operating handle and its related parts are in the main essentials similar to the portions in the housing 26 which act to shift the lamp. The wires or flexible rods 52 upon passing through the flexible conduit 46 are directed into diverging sleeves or the like 54 which are the same as the sleeves 44 on the housing 26, and these sleeves are integral with or mounted on housing elements 56 similar to the housing elements 26 shown in Figure 1 with the exception that slots 58 are formed in the sleeves 54 for convenient attachment of the wires 52 to flexible elements 60 which are merely wires formed in the shape of coil springs.

The rear ends of the flexible elements 60 are attached by means of screws or the like 62 to extending shoulders 64 of mutilated bevel-gears 66 which cooperate with bevel-gears 68 exactly similar to the bevel-gear 22 mounted in the lamp housing support.

Rotatably positioned in the housings 56 is a disk-like element 70 exactly similar to the disk-like element 24 of Figure 4, and a supporting spindle 72 for the gear 68 is rotatably positioned in this disk-like element, this spindle corresponding to the spindle 20 of Figure 4.

The disk-like element 70 has integral shafts 74 projecting sidewise, upon which are rotatably mounted the mutilated bevel-gears 66, these shafts being hollow and adapted for the reception of pins 76 which pins are integral with the housing elements 56 and which constitute bearings for the rotatable movement of the disk-like element 70 thereon. This construction, although not definitely shown, is present in the lamp-shifting device illustrated in Figures 1 and 4.

The operating handle and its associated parts are provided with a supporting bracket 78 which is fitted with convenient screw clamps or the like 80, whereby the same may be readily and conveniently mounted on a dashboard or the like for operation, and if desired, a different support may be provided so that the handle may be mounted on a steering post. A switch assembly 82 is also mounted adjacent the bracket 78 for convenient delivery of lighting current to the lamp through the wires 14.

The support 18 for the lamp housing 10 is provided with an open slot 84 at one end and with an opening 86 at the other end. A fixed screw or the like 88 is mounted in the lamp housing 10 for cooperation with the slot 84, and a removable screw 90 (Figure 1) passes through the hole 86 into a screw-threaded opening in the lamp housing 10 for convenient removal whenever desired. Obviously, when the screw 90 is withdrawn from the opening 86, the lamp housing 10 can be removed from the bracket by simply sliding the screw or rivet 88 out of the slot 84, and the length of wire 14 in the reel housing 16 is sufficient to allow of the carrying of the lamp to any remote part of the automobile.

In Figure 8 is shown a slightly modified form of mounting the lamp, wherein housings 92 similar to housings 26 are fixed in a recess 94 formed in the housing of a lamp 96, the lamp housing 96 being rotatable with respect to the housings 92, the housings 92 being themselves mounted on a supporting bracket 98 which is adapted to be clamped into a suitable portion of the assembly in any obvious manner.

Rotation of the handle 48 will cause the bevel-gear 68 to turn accordingly, thereby moving the associated mutilated bevel-gear 66 in opposite directions and causing a sort of differential action whereby one of the cables 60 with its associated wire 52 will be pushed forwardly in its corresponding housing 54, and the other cable will be moved rearwardly, causing the parts to assume the position illustrated in Figure 3. The wires 52 are accordingly constrained to move longitudinally in a flexible conduit 46, and thereby cause a similar positively rotating action to take place in corresponding gears in the lamp supporting housing 26 which then operate to rotate the bevel-gear 22 and the spindle 20, moving the lamp through a horizontal arc.

On account of the wide latitude afforded, this arc, can be approximately 180° or from one side to the other of the automobile.

Whenever it is desired to move the lamp upwardly or downwardly, the handle 48 is accordingly shifted up or down, thereby rotating the disk-like element 70 and its supporting spindles 74 about the bearing pins 76, causing both of the differential gears 66 to rotate in the same direction, and through the same distance simultaneously, and thereby moving both of the wires 52 either forwardly or rearwardly through the flexible conduit 46. This imparts a similar rotative motion to the corresponding differential gears in the forward housing 26 with the result that the lamp is moved upwardly or downwardly. It will be noted that the slot in the housing 26 and the corresponding slot in the housing 56 are open through almost 180°, thereby allowing of a movement of the shaft of light from the lamp from a nearly vertical to a nearly directly downward position. Obviously, the combination of a turning movement of the handle 48 with either an up or down movement will result in a corresponding shifting of the lamp through an angle somewhere between the horizontal and vertical.

It will be obvious that herein is provided a practically universally mounted spotlight for automobiles or the like, which, on account of its novel features of construction, will be eminently satisfactory, both from an operating and control standpoint, and also with respect to the very desirable feature in that it will positively remain set in any desired position regardless of the amount of bouncing or jolting of the automobile upon which it is mounted.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A universally mounted spotlight, including a support, a differential gear mounting for the light in the support, and an operating handle therefor, said operating handle being remote from the support, and a pair of flexible rods connecting the operating handle to the support, together with a flexible conduit in which said rods are mounted.

2. A universally mounted spotlight, including a support, and an operating handle therefor, said operating handle being remote from the support, and a pair of flexible rods connecting the operating handle to the support, together with a differential gear construction in both the lamp mounting and the handle mechanism.

3. A universally mounted spotlight, including a support, and an operating handle therefor, said operating handle being remote from the support, and a pair of flexible rods connecting the operating handle to the support, together with a differential gear construction in both the lamp mounting and the handle mechanism, and means for connecting said wires to said differential gear construction.

4. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear.

5. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, said last-named bevel-gears being mutilated.

6. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, said last-named bevel gears being mounted on opposite faces of the disk.

7. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and friction means for retarding the rotation of the disk element in the housing.

8. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and friction means for retarding the rotation of the disk element in the housing, said friction means comprising a spring-impelled plate.

9. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and friction means for retarding the rotation of the disk element in the housing, said friction means comprising a spring-impelled plate, mounted in the disk and operating against the inner face of the housing.

10. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and means for resiliently positioning the first-named bevel-gear and its supporting shaft in the disk.

11. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and means for resiliently positioning the first-named bevel-gear and its supporting shaft in the disk, said means comprising a spring-impelled plug mounted in an opening in the disk and acting against the shaft.

12. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and means for resiliently positioning the first-named bevel-gear and its supporting shaft in the disk, said means comprising a spring-impelled plug mounted in an opening in the disk and acting against the shaft, said shaft being annularly recessed at the points of contact of the plug therewith.

13. A universally mounted spotlight, including a support, and an operating handle therefor, said operating handle being remote from the support, and a pair of flexible rods connecting the operating handle to the support, together with a differential gear construction in both the lamp mounting and the handle mechanism, each of said differential gear constructions comprising a housing and disk rotatably mounted in the housing, a shaft rotatably mounted in the disk, a bevel-gear on the shaft, and a pair of bevel-gears rotatably mounted on the disk, and in mesh with said first-named bevel-gear, and means for resiliently positioning the first-named bevel-gear and its supporting shaft in the disk, said means comprising a spring-impelled plug mounted in an opening in the disk and acting against the shaft, together with a set screw for adjusting the tension action of the spring-impelled plug.

In testimony whereof I affix my signature.

ARTHUR KOSIAN.